US010652355B2

(12) United States Patent
Curland et al.

(10) Patent No.: US 10,652,355 B2
(45) Date of Patent: May 12, 2020

(54) COMPONENT PROFILE DISPLAY

(71) Applicant: ENTIT Software LLC, Sunnyvale, CA (US)

(72) Inventors: Sebastian Curland, Yehud (IL); Omer Frieman, Yehud (IL); Avigad Mizrahi, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 175 days.

(21) Appl. No.: 15/745,566

(22) PCT Filed: Jul. 28, 2015

(86) PCT No.: PCT/US2015/042534
§ 371 (c)(1),
(2) Date: Jan. 17, 2018

(87) PCT Pub. No.: WO2017/019047
PCT Pub. Date: Feb. 2, 2017

(65) Prior Publication Data
US 2018/0234522 A1 Aug. 16, 2018

(51) Int. Cl.
H04L 29/08 (2006.01)
G06F 16/951 (2019.01)
(Continued)

(52) U.S. Cl.
CPC ............ H04L 67/32 (2013.01); G06F 3/0483 (2013.01); G06F 8/34 (2013.01); G06F 8/38 (2013.01); G06F 16/951 (2019.01); G06F 16/9535 (2019.01); H04L 67/02 (2013.01); H04L 67/16 (2013.01); H04L 67/20 (2013.01); H04L 67/42 (2013.01)

(58) Field of Classification Search
CPC . G06F 8/38; G06F 8/34; G06F 3/0483; G06F 16/9535; G06F 16/951; H04L 67/42; H04L 67/20; H04L 67/16; H04L 67/02; H04L 67/32
See application file for complete search history.

(56) References Cited

U.S. PATENT DOCUMENTS 8,938,491 B1 1/2015 Colton et al.
9,854,026 B1* 12/2017 Smerald .................. H04L 67/10
(Continued)

OTHER PUBLICATIONS

Apsar, S. et al., "Improved Static Code Analysis Techniques for Automated Testing of Ajax Apps," (Research Paper), Oct. 2013, 4 pages.
(Continued)

Primary Examiner — Shean Tokuta
Assistant Examiner — Juan C Turriate Gastulo

(57) ABSTRACT

A non-transitory machine-readable storage medium is described in which selection instructions receive a selection of a component in a graphical user interface of an application. Identification instructions associate the component with a component identifier, and query instructions identify, in an analysis database, at least one web service call linked to the component identifier. Profile display instructions cause a component profile to be displayed within the graphical user interface, with the component profile comprising the component identifier and the web service call.

20 Claims, 12 Drawing Sheets

(51) Int. Cl.
*G06F 16/9535* (2019.01)
*G06F 8/38* (2018.01)
*G06F 8/34* (2018.01)
*G06F 3/0483* (2013.01)
*H04L 29/06* (2006.01)

(56) References Cited

U.S. PATENT DOCUMENTS

| | | | |
|---|---|---|---|
| 2007/0022154 A1* | 1/2007 | Saunders | G06F 8/30 |
| | | | 709/201 |
| 2008/0104569 A1* | 5/2008 | Gilfix | G06F 8/34 |
| | | | 717/104 |
| 2008/0134089 A1 | 6/2008 | Adachi et al. | |
| 2009/0307190 A1 | 12/2009 | Maresca | |
| 2010/0079462 A1* | 4/2010 | Breeds | G06T 11/206 |
| | | | 345/440 |
| 2012/0102474 A1 | 4/2012 | Artzi et al. | |
| 2013/0104067 A1 | 4/2013 | Sullivan et al. | |
| 2013/0262510 A1* | 10/2013 | Smith | H03M 7/30 |
| | | | 707/770 |
| 2014/0047414 A1 | 2/2014 | Attar et al. | |

OTHER PUBLICATIONS

International Search Report and Written Opinion dated Apr. 26, 2016, PCT Patent Application No. PCT/US2015/042534 dated Jul. 28, 2015,KIPO, 11 pgs.

Nguyen, H.V. et al., "Building Call Graphs for Embedded Client-side Code in Dynamic Web Applications," (Research Paper), Nov. 16-22, 2014, 12 pages.

Rogowski, S., "Code2Flow," (Web Page), Oct. 30, 2014, 4 pages, available at https://github.com/scottrogowski/code2flow.

scitools.com, "Understand Static Code Analysis Tool," (Web Page), retrieved on Jul. 21, 2015, 3 pages, available at https://scitools.com.

Skrupsky, N. et al., "WAVES: Automatic Synthesis of Client-side Validation Code for Web Applications," (Research Paper), Nov. 12, 2012, 8 pages.

* cited by examiner

56

| Application | Client component ID | Web service call | Web service type |
|---|---|---|---|
| QA1 | submitNewUserButtonId | /app/service/users | POST |

| Web Service | Method name | Called by | Category | Value |
|---|---|---|---|---|
| /createUser | createUserImpl | null | SERVER_LOGIC | Null |
| /createUser | insertUser | createUserImpl | DB_QUERY | Users_Table |
| /createUser | insertUserValidator | createUserImpl | THIRD_PARTY | /validationServer/validateNewUser |

FIG. 4

NON-TRANSITORY MACHINE-READABLE STORAGE MEDIUM 1000

Selection instructions to receive a selection of a component in a graphical user interface of an application 1004

Identification instructions to associate the component with a component identifier 1008

Query instructions to identify, in an analysis database, at least one web service call linked to the component identifier 1012

Query instructions to also identify at least one sub-call from the web service call 1016

Profile display instructions to cause a component profile to be displayed within the graphical user interface, the component profile comprising the component identifier and the web service call 1020

Profile display instructions to display the component profile in a manner visually linking the component profile to the component 1024

Profile display instructions to display the component profile in close proximity to the selected component 1028

Profile display instructions to display the component profile and the selected component in a coordinated visual style 1032

Filter instructions to filter the component profile by a type to yield a type-filtered component profile 1036

Profile display instructions to cause only the type-filtered component profile to be displayed within the graphical user interface display 1040

FIG. 10A

NON-TRANSITORY MACHINE-READABLE STORAGE MEDIUM 1000

Non-transitory machine-readable storage medium comprises a plug-in for a web browser 1044

Where the web service call identifies a first function executed at a first server, the component profile further comprises a third party call from the first server that identifies a second function executed at a second server 1048

Component profile further comprises at least one database query 1052

Component profile comprises combination of a client component map that links component identifier to the web service call and a web service map that is called by the web service call 1056

FIG. 10B

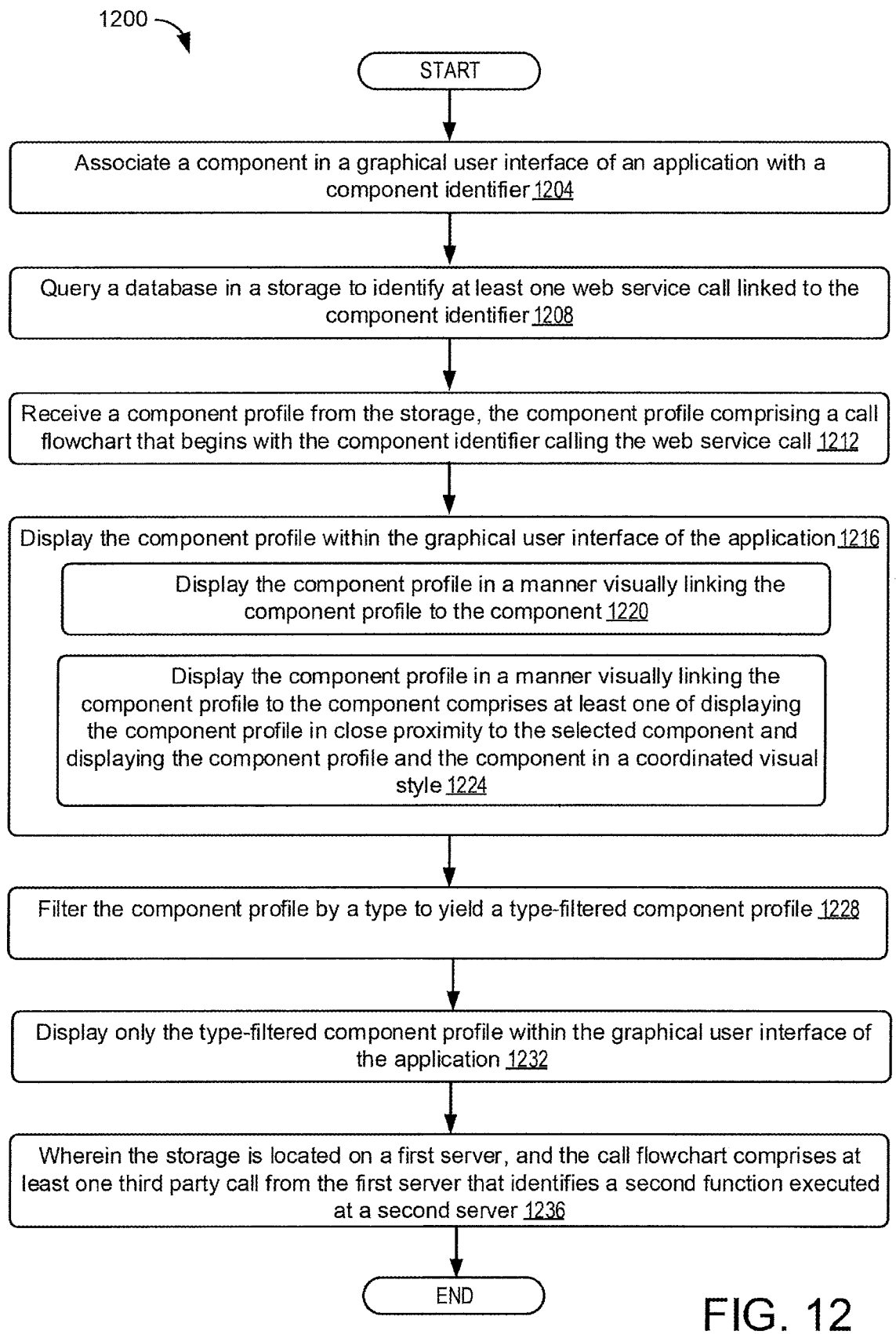

COMPONENT PROFILE DISPLAY

BACKGROUND

When working with client-server applications, analyzing and understanding complete client-side and server-side code flows can be challenging and time-consuming. Full stack developers, QA personnel and other users who develop and test such applications may need to acquire a detailed understanding of the application's logic, such as methods utilized, databases accessed, third party servers called, etc. In some cases a developer or tester is required to manually review the code from client to server to understand each and every portion of the code that is relevant to her task. In some cases relevant code may be inaccessible.

BRIEF DESCRIPTION OF THE DRAWINGS

FIG. 3 is an illustration of a client component map according to an example of the present disclosure.

FIG. 4 is an illustration of a web service map according to an example of the present disclosure.

FIGS. 10A and 10B are a block diagram of a non-transitory machine-readable storage medium containing instructions according to another example of the present disclosure.

FIG. 12 is a flow chart of a method for displaying a component profile according to an example of the present disclosure.

DETAILED DESCRIPTION

Figure 1:
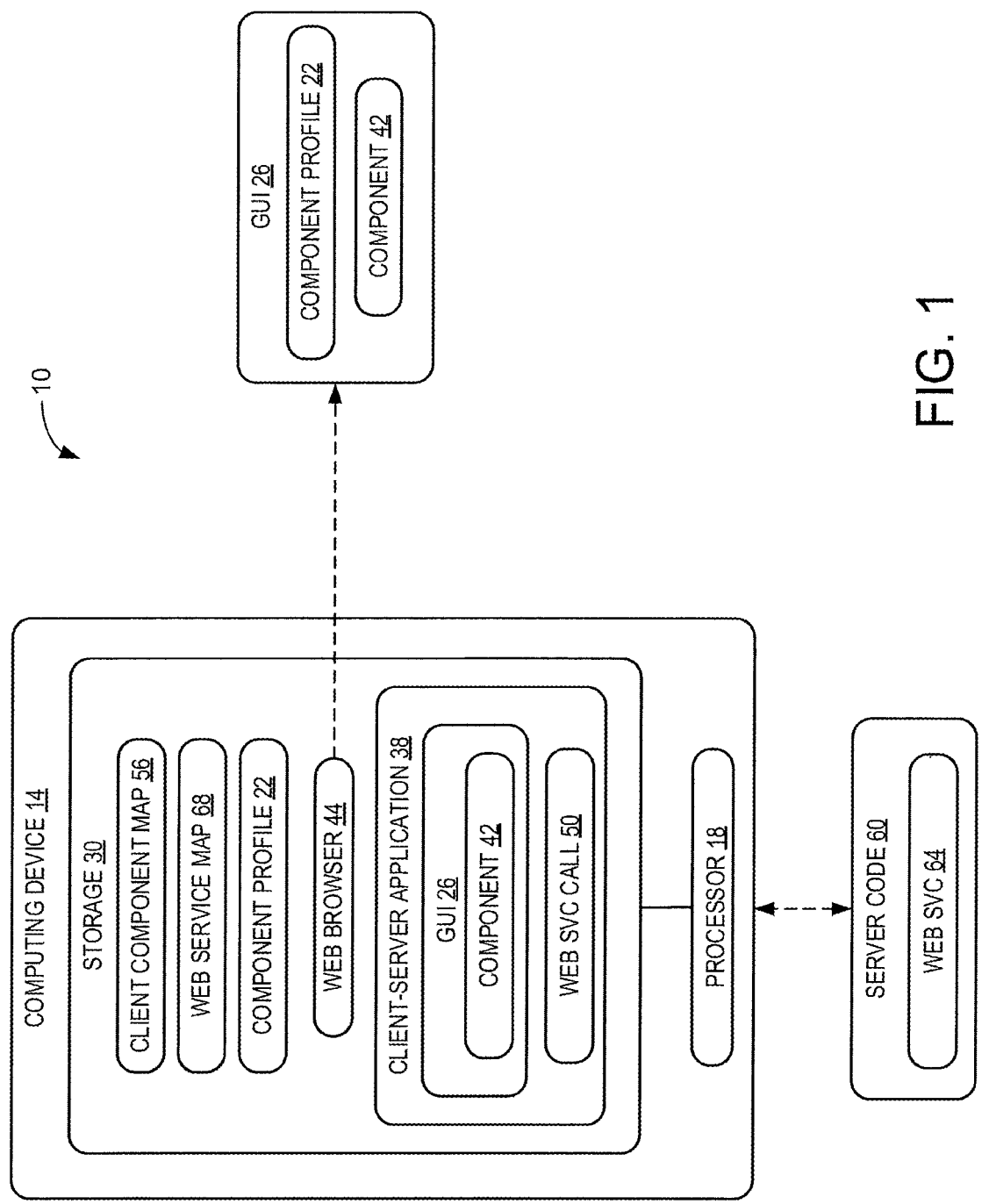
FIG. 1 is a block diagram of a system for displaying a component profile according to an example of the present disclosure.

Analyzing and understanding both client-side code flows and server-side code flows for a client-server application can be a challenging and time-consuming endeavor. For example, a developer may be tasked with implementing a new user story in a client-server application that changes an application's behavior and creates modified client-side and server-side code flows. In one example, the user story may include adding a new "user phone" field to the application's graphical user interface (GUI), adding a server validation to validate a phone number inputted by a user, and saving the field in a database.

In this example, the developer needs to add the new phone field to a "new user" form in the client-side code of the application, find the location of the server validations via web services and add a new validation for the phone number, and find the database table name and the location (method) of the insert query to the database. Currently, exiting solutions do not provide a convenient way to aggregate and present all of this information to the developer in a useful format. Accordingly, the developer is left to separately scan and analyze the client-server application code and the relevant server code, and attempt to locate those particular web service calls, database queries, and other portions of the code flow that are relevant to the developer's task. In some cases, the developer may not have access to source code that is relevant to a particular component or function of interest. For example, where a third party server call made by a web service is of interest, the source code of the third party server may not be available to the developer.

In other examples, quality assurance (QA) personnel may be tasked with creating a testing plan for a feature of a client-server application. The QA personnel may have a limited understanding of the feature they are testing and the logic underlying the feature. Thus, it may be difficult to create a testing plan that addresses the full functionality of the feature. Additionally, with just a superficial understanding of the relevant application logic, it may be challenging and sometimes impossible for QA personnel to determine the root cause of a failed test. As in the example described above, to obtain a complete understanding of the pertinent application logic, such QA personnel would need to manually scan and analyze both the client-side code and the server-side code.

In some existing solutions, code call graphs for only server-side code of an application may be generated. In other examples, code call graphs for only client-side code of an application may be generated. Such solutions do not support cross application code flows, i.e. client to server code flows. Thus, none of these solutions enable a user to see aggregated information of complete code flows of an application from client-side to server-side. Further, such solutions are unable to provide a developer or other user with a complete client-to-server code flow as viewed from the user interface of the actual application.

The present disclosure describes examples of a computing device, method and non-transitory machine-readable storage media for displaying a component profile within a graphical user interface (GUI) of an application. In one example and with reference to FIG. 1, a block diagram of a system 10 for displaying a component profile according to an example of the present disclosure is provided. As described in more detail below, the system 10 may comprise a computing device 14 that includes a processor 18 that executes instructions for displaying a component profile 22 within a graphical user interface (GUI) 26 of an application. In some examples the processor 18 may comprise a plurality of processors.

The processor 18 may include at least one physical device configured to execute at least one instruction. For example, the processor 18 may be configured to execute instructions that are stored on a non-transitory machine-readable storage medium. Such instructions may be part of at least one application, agent, module, service, program, routine, library, object, component, data structure, or other logical construct. Such instructions may be implemented to perform methods and functions described herein, or to perform a task, implement a data type, transform the state of at least one device, or otherwise arrive at a desired result.

Storage 30 may store instructions executable by the processor 18. As described in more detail below, in some examples storage 30 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 40 may include memory devices with at least one of the following characteristics: volatile, nonvolatile, dynamic, static, read/write, read-only, random access, sequential access, location addressable, file addressable, and content addressable.

In some examples, the processor 18 and storage 30 may be components of at least one computing device, such as computing device 14. In some examples, such computing device may take the form of a server, network computing device, desktop computing device, and/or other suitable type of computing device.

Storage 30 may store instructions comprising a client-server application 38, with the application comprising code for generating GUI 26 and code for generating component 42. A web browser 44 may be configured to display the GUI 26 and the component profile 22 via client-server application 38. In other examples, another computing device may include a web browser that displays the GUI 26 of the client-server application 38 and component profile 22. In some examples the client-server application 38 may reside on another computing device, such as a server. As described in more detail below, the GUI 26 may include a component 42 which may be selectable via user input. Examples of selectable components include buttons, sliders, drop-down menus, data input regions, etc. In some examples, selection of component 42 may trigger a web service call 50.

The processor 18 of computing device 14 may execute instructions to scan the client-server application 38 to identify at least one web service call 50 and at least one component 42 in the GUI 26 that calls the web service call. As described in more detail below, a client component map 56 that links a component identifier of the component 42 to the web service call 50 may be generated. The processor 18 also may execute instructions to scan server code 60 to identify at least one web service 64 that is called by the web service call 50. In some examples the server code 60 may be located on another computing device, such as a server. In other examples, server code 60 may be located in storage 30 of computing device 14. A web service map 68 comprising the web service call 50 may be generated. In some examples and as described in more detail below, the web service map 68 may include at least one sub-call from the web service call 50.

The processor 18 also may execute instructions to combine the client component map 56 and the web service map 68 into a component profile 22. The component profile 22 may be sent to the web browser 44 for display within the GUI 26 presented by the browser. As described and illustrated in the examples discussed below, upon selection of the component 42 in the GUI 26 by a user, the component profile 22 may be displayed in a manner visually linking the component profile to the component 42. In this manner, with a single click or selection of the component 42, a user such as a developer may conveniently visualize the corresponding component profile 22 in context with the component.

Further, such component profile 22 may comprise a combination of the client component map 56 and the web service map 68, beginning with the component identifier calling the web service call. In this manner, the component profile 42 may be conveniently displayed to the developer from the point of view of the corresponding component 42 that is of interest to the developer. Accordingly, the developer may be provided with a complete client-to-server code flow for a component of interest, with such information displayed within the GUI 26 of the application under development.

Figure 2:
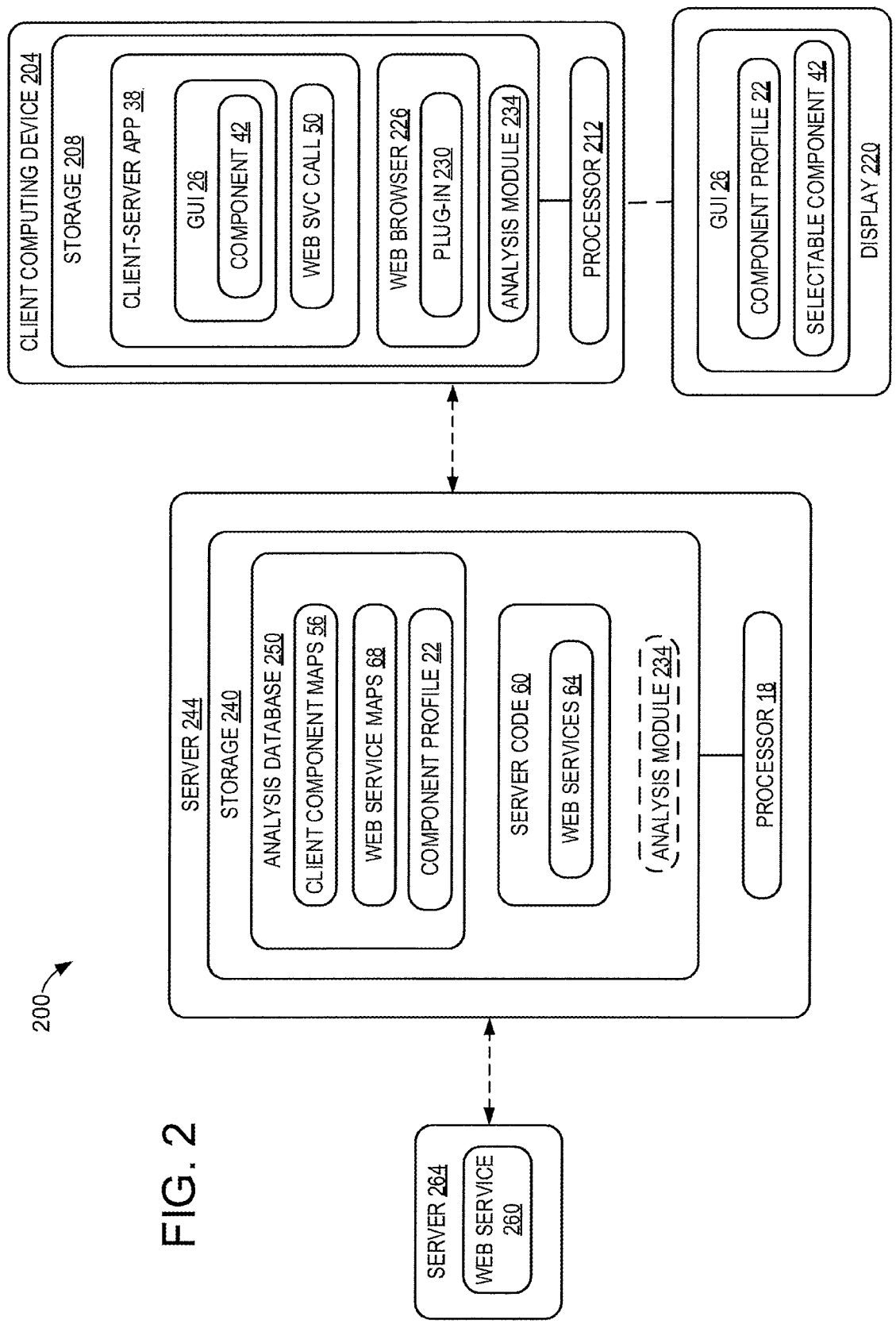
FIG. 2 is a block diagram illustrating a system for displaying a component profile according to another example of the present disclosure.

Turning now to FIGS. 2-7, example systems and use cases of displaying a component profile according to examples of the present disclosure are provided. FIG. 2 illustrates a block diagram showing one example of a system 200 for displaying a component profile according to an example of the present disclosure. In this example, a client computing device 204 may comprise a storage 208 and a processor 212 that executes instructions for displaying a component profile 22 within a GUI 26 of an application. In some examples the processor 212 may comprise a plurality of processors. The client computing device 204 may be communicatively coupled to a display 220 that may display the GUI 26.

The processor 212 may include at least one physical device configured to execute at least one instruction. For example, the processor 212 may be configured to execute instructions that are stored on a non-transitory machine-readable storage medium. Such instructions may be part of at least one application, agent, service, program, routine, library, object, component, data structure, or other logical construct. Such instructions may be implemented to perform methods and functions described herein, or to perform a task, implement a data type, transform the state of at least one device, or otherwise arrive at a desired result.

Storage 208 may store instructions executable by the processor 212. In some examples storage 208 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 208 may include memory devices with at least one of the following characteristics: volatile, nonvolatile, dynamic, static, read/write, read-only, random access, sequential access, location addressable, file addressable, and content addressable.

In some examples, the processor 212 and storage 208 may be components of at least one computing device, such as client computing device 204. In other examples, such computing device may take the form of a network computing device, desktop computing device, and/or other suitable type of computing device.

As described above for the example computing device 14 of FIG. 1, storage 208 may store instructions comprising a client-server application 38, with the application comprising code for generating GUI 26 and code for generating at least one component 42, which may be a selectable component. A web browser 226 may be configured to display the GUI 26 via client-server application 38. As described in more detail below, a plug-in 230 to the browser may cause the component profile 22 to be displayed within the GUI 26.

Figure 5:
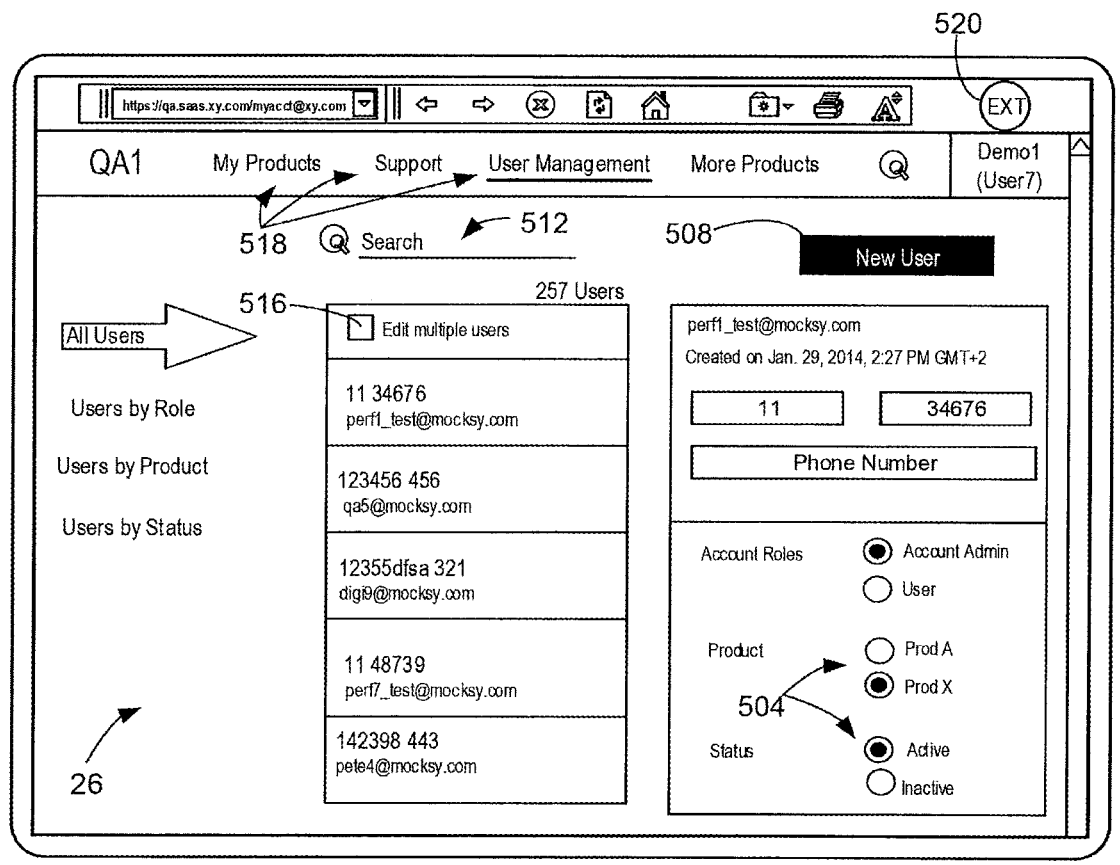
FIG. 5 is an illustration of a graphical user interface according to an example of the present disclosure.

With reference to FIG. 5, in one use case example the client-server application 38 may comprise a quality assurance (QA) application "QA1". The QA application may generate a GUI 26 that includes a plurality of user-selectable components, such as radio buttons 504, New User button 508, Search field 512, checkbox 516, selectable menu items 518, etc. A user of the QA application may desire to understand the logic underlying one or more of the selectable components in the GUI 26. As described in more detail below, when a component is selected by the user, a component profile comprising the component identifier and at least one web service call linked to the component may be generated and displayed within the GUI 26.

While the following description is provided with reference to an example QA application, the principles of the present disclosure may be utilized with any application that utilizes a client-server model, such as for example email applications, networking applications, gaming applications, etc.

With reference again to FIG. 2, to enable the generation of a component profile 22 for each component of the client-server application 38, storage 208 may further include an analysis module 234 containing instructions executable by the processor 212 to, in a first phase, scan the client-server application 38 to identify each web service that is called by the application. In some examples, the analysis module 234 may perform a static analysis of the client-server application files to identify all server calls to a web service. A web service may comprise a software system designed to support interoperable machine-to-machine interaction over a network. Examples of web services include, but are not limited to, REST-compliant web services that manipulate representations of web resources using a uniform set of stateless operations, and arbitrary web services, such as SOAP and WSDL-based web services, in which the service may expose an arbitrary set of operations.

In some examples, to identify each web service that is called by the application, the analysis module 234 may utilize a database of known server calls, such as REST-compliant calls, SOAP calls, WSDL calls, etc. With reference to an example client-server application 38 that may generate the GUI 26 shown in FIG. 5, the analysis module 234 may scan the client-server application code and find the following REST-compliant web service call that is used for creating a new user for the application:

```
Function saveNewUser (newUserObject) {
    $http.post("/app/service/users", newUserObject);
}
```

For each web service call that is identified, the analysis module 234 scans the client-server application 38 to find which GUI component(s) and code flow(s) generate this call to the web service. With reference to the example GUI 26 shown in FIG. 5, the analysis module 234 may scan the client-server application code and find the following selectable submit button (corresponding to New User button 508) in an "add new user" form which calls the above call:

```
<button    id='submitNewUserButtonId'    ng-click=
'saveNewUser( );'class='Btn_action'>
    Create
</button>
```

The analysis module 234 may determine that the component identifier of this component is 'submitNewUserButtonId'. With reference now to FIG. 3, the analysis module 234 may then generate and store a client component map 56 that includes the component identifier in the form of a client component ID (submitNewUserButtonId), the corresponding application (QA1), the web service call (/app/service/users), and the web service type or method (POST). Additional web service calls and corresponding component identifiers of other components also may be discovered, and corresponding additional client component maps 56 may be generated and stored.

In some examples, a selectable component in the GUI 26 may call a chain of functions that end with a call to the web service. For example, the New User button 508 may call function A, function A may call function B, and function B may call the 'saveNewUser' function discussed above.

With reference again to FIG. 2, in some examples the client component maps 56 generated by analysis module 234 may be stored in an analysis database 250 located in server 244 or in another storage or other computing device. The client computing device 204 may be communicatively coupled to the server 244 via a network, such as a local area network (LAN), wide area network (WAN), wired network, wireless network, or a combination thereof, and which may include the Internet. In other examples, the client component maps 56 may be stored in storage 208 of client computing device 204. In some examples, the analysis module 234 may be located in storage 240 of server 244 and executed by processor 250 to perform the functions described herein.

With continued reference to FIG. 2, the analysis module 234 may contain instructions executable by the processor 212 in a second phase to scan the server code 60 to identify web services 64. In some examples the analysis module 234 may identify web services 64 that are called by the components of the client-server application 38 that were found in the first phase discussed above. As described in more detail below, component profiles may be generated that map the client-to-server code flows from a selected component to the web service called by that component, and any sub-calls from the web service.

For each web service 64 that is located, the analysis module 234 may programmatically build a web service map 68 that may comprise a code call graph showing code flows and any sub-calls from the web service. For a particular web service 64 that is identified, the analysis module 234 may search for other web services and/or other related functions and methods called by the identified web service, such as database queries, third party calls, other server calls, etc. In some examples, such code call graphs may be generated via static analysis of the server code files using static analysis tools or platforms.

With reference to the example above in which the web service call/app/service/users was located in the client server application code, the analysis module 234 may identify a web service (for example, /createUser) that is called by this web service call. Once the web service /createUser is identified, the analysis module 234 may identify additional information related to the web service, such as a corresponding method name and a category, and may search for sub-calls to other functions and methods called by such service.

With reference to FIG. 4, in this example the web service map 68 may comprise the web service (/createUser) called by the web service call app/service/users in the example above, and a database query and a third party server validation call made by the web service. As shown in this example, the web service method createUserimpl calls the insertUser method to make a database query. The web service method createUserImpl also makes a third party server call via the insertUserValidator method to a URL having the value /validationServer/validateNewUser to validate data related to a new user.

For example and with reference again to FIG. 2, a web service 64 hosted on server 244 may make a third party server call to another web service 260 hosted on a different server 264. In this manner, another function performed by web service 260 and utilized by web service 64 may be identified. In other examples, server 264 may call other third party server(s) in a server-to-server chain, and such code flow may be captured in the web service map 68. In other examples of web services, fewer or more server calls, data base queries, and other third party calls may be made. In this manner, the web service map 68 may start with the method createUserImpl and include all code flows from this starting point.

In some examples, the client component map 56 for the component identifier (in this example, submitNewUserButtonId) and the corresponding web service map 68 for the web service (/createUser) called by this component may be combined to create a component profile 22. In some examples, the component profile 22 comprises a call flowchart that begins with the component identifier calling the web service call for the web service, and includes any sub-calls from the web service. Additionally and as described in more detail below, the component profile 22 may be conveniently displayed within the GUI 26, thereby providing a user with a complete client-to-server code graph from a selected component in the GUI 26 to all server-side functions and methods related to that component.

As noted above, in some examples a plug-in 230 to the web browser 226 may cause the component profile 22 to be displayed within the GUI 26. In some examples, generation of the client component maps 56 of the client-server application 38, the web service maps 68 of the server code 60, and/or the component profile 22 may be performed prior to the plug-in 230 being executed in the web browser 226. For example, upon initial installation of the plug-in 230 and analysis module 234, the client-server application 38 and the server code 60 may be analyzed as described above, and corresponding client component maps 56 and web service maps 68 may be generated. In this example, when the plug-in 230 is enabled in web browser 226, the relevant client component maps 56 and the corresponding web service maps 68 have been previously generated and are available for constructing component profiles 22 of selected components in the GUI 26.

In some examples, component profiles 22 for each of the components in the client component maps 56 may be generated upon such installation or at another point prior to execution of the plug-in 230. In other examples, and as described in more detail below, upon a user selection of a component 42 in the GUI 26, a component profile 22 may be generated using the previously-generated client component maps 56 and web service maps 68.

With reference again to FIG. 5, an example use case of the present disclosure will be provided. In one example, a developer user of the QA1 application may be testing functionality associated with adding a new user via the New User button 508. The developer would like to understand how the New User button 508 behaves, and see the full client-to-server logic underlying the New User button 508, including all of the web services and other methods and functions associated with the button. In some examples, the developer may not have access to all of the source code associated with such web services, methods and functions, such as source code of the server code 60 and/or other web services and code located on other servers or in other third party storage.

In one example, the user may select the EXT button 520 to activate the plug-in 230 and enable the generation and display of component profiles 22 for components in the GUI 26. Once the plug-in 230 is activated, the user may select any selectable component in the GUI 26 to trigger the generation and display of a component profile 22 for that component.

In the present example, the user may select the New User button 508. Upon receiving the selection of the New User button 508, the plug-in 230 may associate this component with its component identifier, such as the client component ID (submitNewUserButtonId) from the client component map 56 of FIG. 3. With the component identifier of the New User button 508 identified, the analysis database 250 may be queried to identify the web service call(s) 64 that are linked to this component identifier. For example, the plug-in 230 may identify a web service map 68 for the web service call(s) 64 linked to the component identifier. As noted above, in some examples the plug-in 230 may combine the client component map 56 for the New User button 508 with the web service map 68 for the web service call(s) 64 linked to the component identifier to generate a component profile 22 for this component. In some examples, the component profile 22 may be generated at the server 244, stored in the analysis database 250 and received by the plug-in 230.

Figure 6:
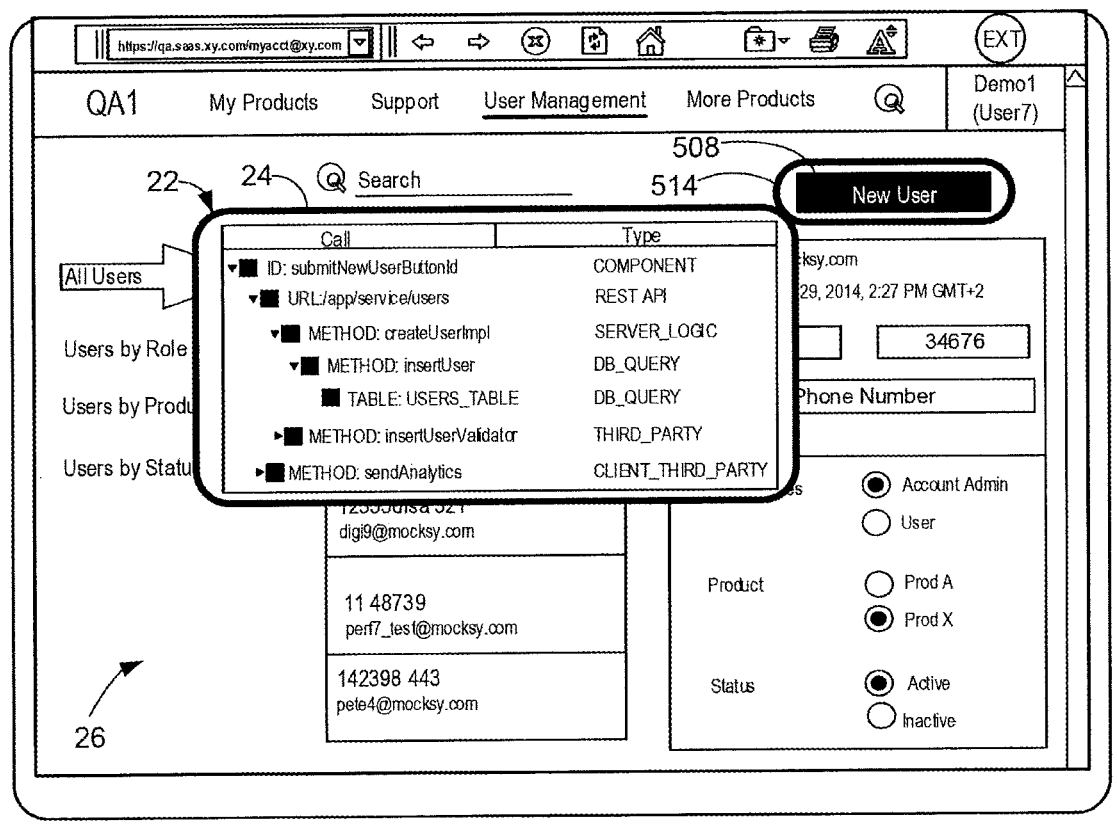
FIG. 6 is an illustration of the graphical user interface of FIG. 5 including a component profile according to an example of the present disclosure.

With reference now to FIG. 6, the plug-in 230 may cause the component profile 22 to be displayed within the GUI 26 of the QA1 application. In this example, the component profile 22 comprises a sequenced listing of all methods, functions and other calls related to the selected component (New User button 508). In some examples, the component profile 22 may comprise an ordered combination of information from the client component map 56 and the web service map 68 for the selected component. As shown in the component profile 22 of FIG. 6, the ordered combination may begin with the component ID and may illustrate the complete client-to-server code flow associated with this component. In this manner, the user can conveniently visualize the complete code flow for the selected component, with such flow presented from the point of view of the component.

In the example of FIG. 6, the component profile 22 includes the information from the client component map 56 for the submitNewUserButtonID component as discussed above, including the web service call to URL: /app/service/users. Following this web service call is the information from the web service map 68 for the web service called by/app/service/users, namely the Method createUserimpl. In this example, the component profile 22 includes the database query and third party validation sub-calls identified in the web service map 68 discussed above. In this example, the component profile 22 also includes a sendAnalytics third party call, which may have been identified. Accordingly, the component profile 22 presents a complete client-to-server, call-by-call code graph of the logic underlying the selected component.

As shown in the example of FIG. 6, this example of a component profile 22 includes two columns of information: a Call column identifying the particular call, and a Type column identifying a type of the call. In some examples of component profiles, the Type column may not be displayed. In other examples of component profiles, additional column (s) of information from the web service map 68 may be displayed in addition to the Type column. For example, a component profile 22 may include the Call column, the Type column and a Value column from a corresponding web service map 68. In still other examples, additional column(s) of information from the web service map 68 may be displayed while the Type column is not displayed.

As shown in the example of FIG. 6, by displaying the component profile 22 within the actual GUI 26 in which the component is utilized, a developer may conveniently and quickly visualize the entire client-to-server code flow of the component of interest. Additionally and in some examples, the component profile 22 may be displayed in a manner that visually links the component profile to the component to which it corresponds. In this manner, the association between the selected component and its component profile may be further enhanced.

In some examples the component profile 22 may be displayed in close proximity to the corresponding component, including but not limited to touching the component. As illustrated in the example of FIG. 6, a border 24 of the component profile 22 may be displayed as touching a border 514 of the New User button 508. In another example, the border 24 of the component profile 22 and the border 514 of the New User button 508 may be displayed adjacent to one another without touching.

In some examples, the component profile 22 may be displayed in a manner that visually links the component profile to the component to which it corresponds by displaying the component profile and the component in a coordinated visual style. For example, in the example of FIG. 6 both the border 24 of the component profile 22 and the border 514 of the New User button 508 may be displayed in a similarly highlighted style, such as by displaying the borders with a similar darkened line. In other examples, other manners of visually coordinating the component profile 22 and its corresponding component may be utilized, such as displaying the profile and component in the same color, with a similar distinctive font, as animated in a similar fashion, etc.

Figure 7:
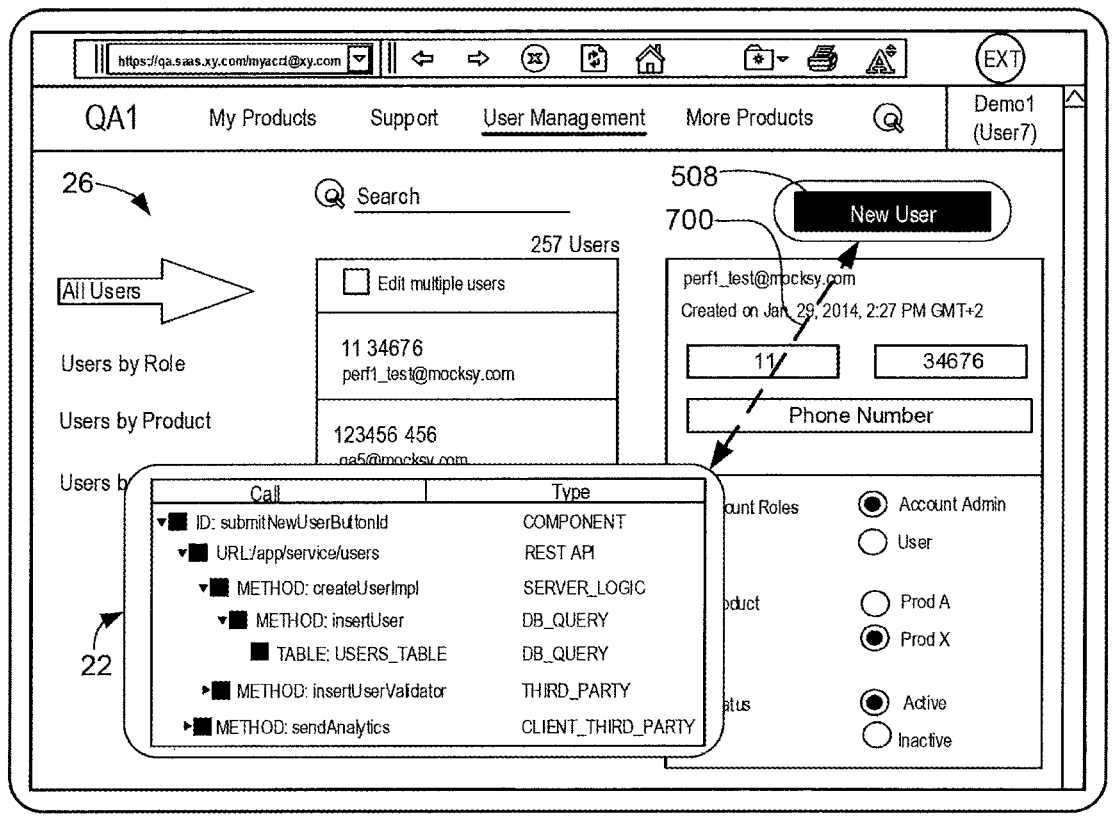
FIG. 7 is an illustration of the graphical user interface of FIG. 5 including a component profile according to another example of the present disclosure.
Figure 8:
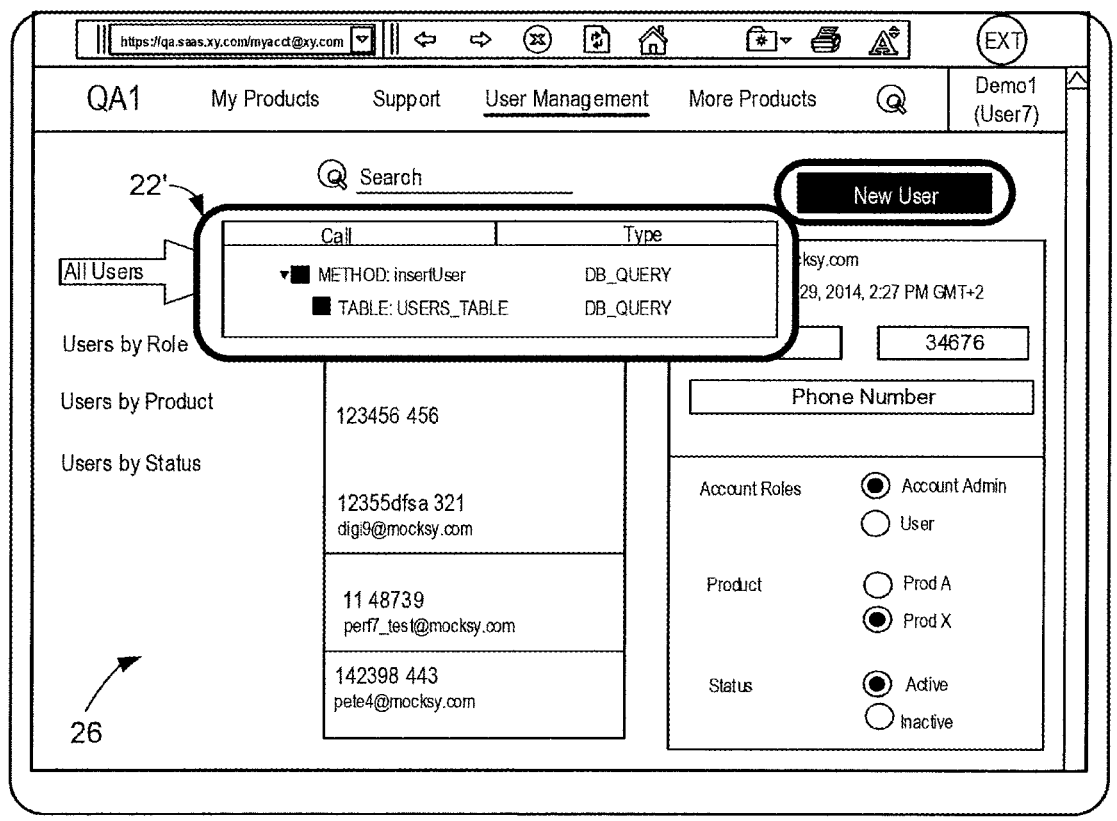
FIG. 8 is an illustration of the graphical user interface of FIG. 5 including a filtered component profile according to another example of the present disclosure.

With reference to FIG. 7, in some examples the component profile 22 may be displayed in a manner visually linking it to its corresponding component by visually connecting the profile and component. In the example of FIG. 7, while the component profile 22 and New User button 508 are not displayed in close proximity to one another, the profile and this component are visually linked by an arrow 700. Many other examples of visually linking a component profile 22 to its corresponding component also may be utilized and are within the scope of the present disclosure With reference now to FIG. 8, in some examples a user may desire to see only certain types of information in the component profile 22 for a component. Accordingly, the plug-in 230 may filter the component profile by a type to yield a type-filtered component profile 22'. In some examples, the type may comprise a function or category of a call. As shown in the example of FIG. 8, when the user selects to filter the component profile 22 of FIG. 7 to display only database queries, a corresponding type-filtered component profile 22' that includes only the database queries is generated and displayed in GUI 26.

Figure 9:
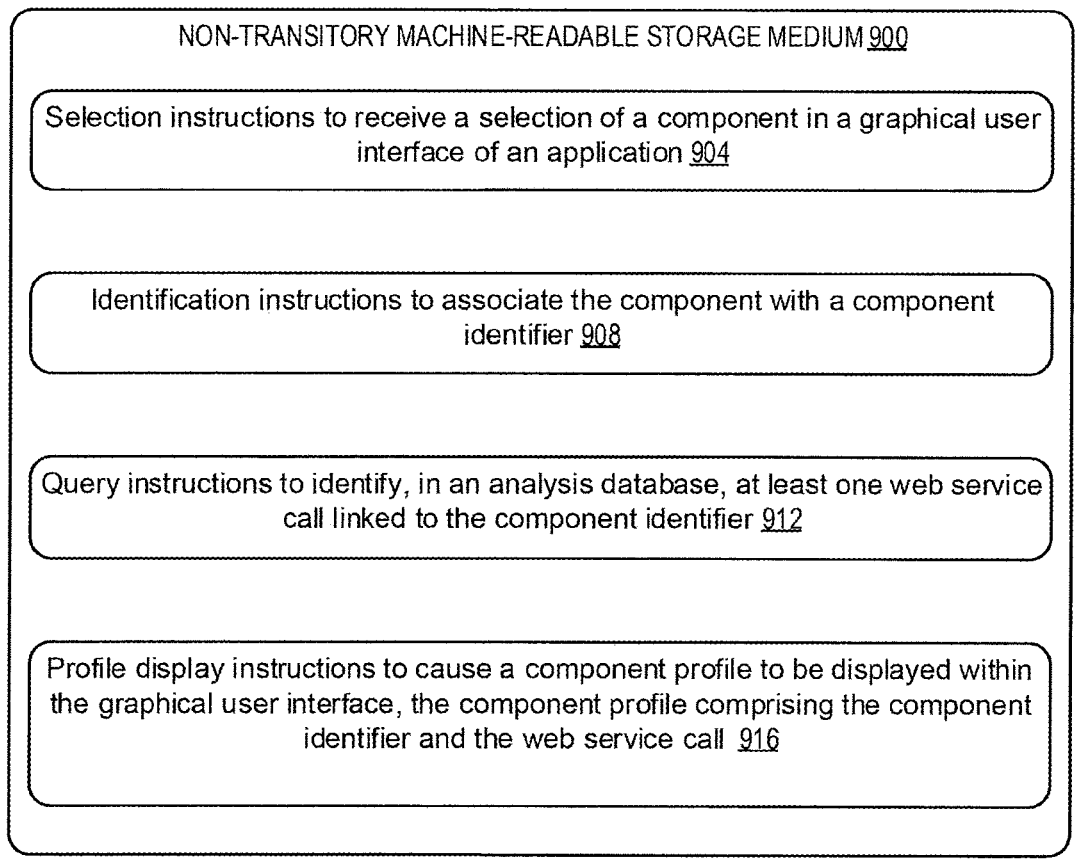
FIG. 9 is a block diagram of a non-transitory machine-readable storage medium containing instructions according to an example of the present disclosure.

With reference now to FIG. 9, a block diagram of a non-transitory machine-readable storage medium 900 containing instructions according to an example of the present disclosure is provided. In some examples and with reference also to FIG. 2, the non-transitory machine-readable storage medium may comprise instructions for performing the functions and methods described above. When executed by at least one processor, such as processor 212 of the computing device 204, such instructions may create client component maps 56 and web service maps 68, and may generate and display component profiles 22 in a manner consistent with the following example and other examples described herein.

In the example of FIG. 9 the instructions of non-transitory machine-readable storage medium 900 may include selection instructions 904 to receive a selection of a component in a graphical user interface of an application. The instructions may include identification instructions 908 to associate the component with a component identifier. The instructions may include query instructions 912 to identify, in an analysis database, at least one web service call linked to the component identifier. The instructions may include profile display instructions 916 to cause a component profile to be displayed within the graphical user interface, the component profile comprising the component identifier and the web service call.

With reference now to FIGS. 10A and 10B, a block diagram of a non-transitory machine-readable storage medium 1000 containing instructions according to another example of the present disclosure is provided. In some examples and with reference also to FIG. 2, the non-transitory machine-readable storage medium 1000 may comprise instructions for performing the functions and methods described above. When executed by at least one processor, such as processor 212 of the computing device 204, such instructions may create client component maps 56 and web service maps 68, and may generate and display component profiles 22 in a manner consistent with the following example and other examples described herein.

In the example of FIGS. 10A and 10B, the instructions of non-transitory machine-readable storage medium 1000 may include selection instructions 1004 to receive a selection of a component in a graphical user interface of an application. The instructions may include identification instructions 1008 to associate the component with a component identifier. The instructions may include query instructions 1012 to identify, in an analysis database, at least one web service call linked to the component identifier. The instructions may also include query instructions 1016 to also identify at least one sub-call from the web service call.

The instructions may include profile display instructions 1020 to cause a component profile 22 to be displayed within the graphical user interface, the component profile comprising the component identifier and the web service call. The instructions may also include profile display instructions 1024 to display the component profile in a manner visually linking the component profile to the component. The instructions may include profile display instructions 1028 to display the component profile in close proximity to the selected component. The instructions may include profile display instructions 1032 to display the component profile and the selected component in a coordinated visual style. The instructions may include filter instructions 1036 to filter the component profile by a type to yield a type-filtered component profile. The instructions may include profile display instructions 1040 to cause only the type-filtered component profile to be displayed within the graphical user interface display.

With reference now to FIG. 10B, at 1044 the non-transitory machine-readable storage medium 1000 may comprise a plug-in for a web browser. At 1048, where the web service call identifies a first function executed at a first server, the component profile may further comprise a third party call from the first server that identifies a second function executed at a second server. At 1052 the component profile may further comprise at least one database query. At 1056 the component profile may further comprise a combination of a client component map that links the component identifier to the web service call and a web service map that is called by the web service call.

Figure 11:
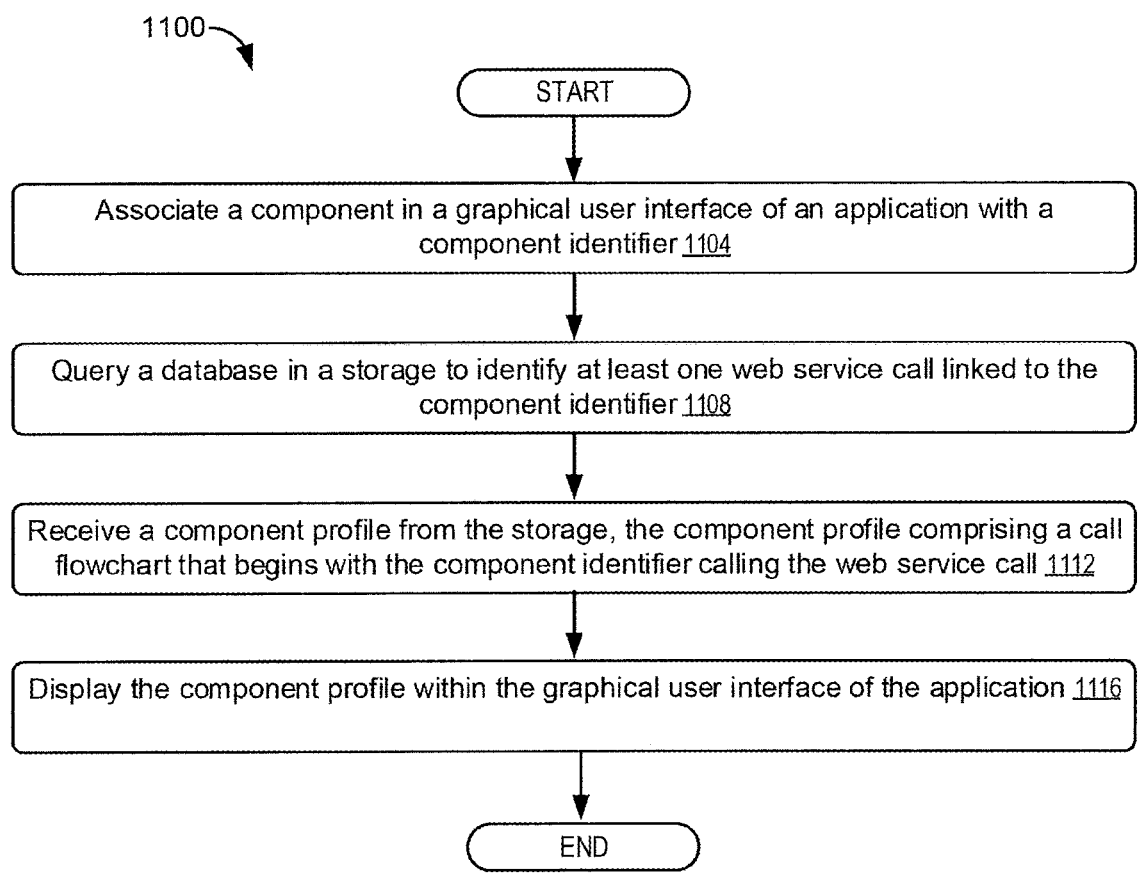
FIG. 11 is a flow chart of a method for displaying a component profile according to an example of the present disclosure.

Turning now to FIG. 11, a flow chart of a method 1100 for displaying a component profile within a graphical user interface according to another example of the present disclosure is provided. The following description of method 1100 is provided with reference to the software and hardware components described above and shown in FIGS. 1-10. The method 1100 may be executed in the form of instructions encoded on a non-transitory machine-readable storage medium that is executable by a processor. It will be appreciated that method 1100 may also be performed in other contexts using other suitable hardware and software components.

With reference to FIG. 11, at 1104 the method 1100 may include associating a component in a graphical user interface of an application with a component identifier. At 1108 the method 1100 may include querying a database in a storage to identify at least one web service call linked to the component identifier. At 1112 the method 1100 may include receiving a component profile from the storage, the component profile comprising a call flowchart that begins with the component identifier calling the web service call. At 1116 the method 1100 may include displaying the component profile within the graphical user interface of the application.

It will be appreciated that method 1100 is provided by way of example and is not meant to be limiting. Therefore, it is to be understood that method 1100 may include additional and/or other steps than those illustrated in FIG. 11. Further, it is to be understood that method 1100 may be performed in any suitable order. Further still, it is to be understood that at least one step may be omitted from method 1100 without departing from the scope of this disclosure.

Turning now to FIG. 12, a flow chart of a method 1200 for displaying a component profile within a graphical user interface according to another example of the present disclosure is provided. The following description of method 1200 is provided with reference to the software and hardware components described above and shown in FIGS. 1-10. The method 1200 may be executed in the form of instructions encoded on a non-transitory machine-readable storage medium that is executable by a processor. It will be appreciated that method 1200 may also be performed in other contexts using other suitable hardware and software components.

With reference to FIG. 12, at 1204 the method 1200 may include associating a component in a graphical user interface of an application with a component identifier. At 1208 the method 1200 may include querying a database in a storage to identify at least one web service call linked to the component identifier. At 1212 the method 1100 may include receiving a component profile from the storage, the component profile comprising a call flowchart that begins with the component identifier calling the web service call. At 1216 the method 1200 may include displaying the component profile within the graphical user interface of the application. At 1220 the method 1200 may include displaying the component profile in a manner visually linking the component profile to the component. At 1224 the method 1200 may include displaying the component profile in a manner visually linking the component profile to the component by at least one of displaying the component profile in close proximity to the selected component and displaying the component profile and the component in a coordinated visual style.

At 1228 the method 1200 may include filtering the component profile by a type to yield a type-filtered component profile. At 1232 the method 1200 may include displaying only the type-filtered component profile within the graphical user interface of the application. At 1236 the method 1200 may include the storage located on a first server, and the call flowchart comprising at least one third party call from the first server that identifies a second function executed at a second server.

It will be appreciated that method 1200 is provided by way of example and is not meant to be limiting. Therefore, it is to be understood that method 1200 may include additional and/or other steps than those illustrated in FIG. 12. Further, it is to be understood that method 1200 may be performed in any suitable order. Further still, it is to be understood that at least one step may be omitted from method 1200 without departing from the scope of this disclosure.

The invention claimed is:

1. A non-transitory machine-readable storage medium storing instructions executable by a processor to:
   scan code of an application to identify, in the code of the application, a first web service call and a first component to be displayed in a graphical user interface that calls the first web service call;
   scan code of a server to identify a web service to be called by the first web service call;
   combine results of the scanning of the code of the application and of the server to generate a component profile of the first component, the component profile comprising a code flow from an identifier of the first component to the first web service call and to the web service;
   execute the application to display the first component on the graphical user interface;
   in response to the first component on the graphical user interface being selected, associate the first component with the identifier of the first component;
   identify, in a database, the component profile of the first component based on the identifier of the first component; and
   cause a cause the component profile of the first component identified in the database to be displayed within the graphical user interface as a result of the first component being selected.

2. The non-transitory machine-readable storage medium of claim 1, wherein the instructions are executable to cause the processor to:
   subsequent to scanning the code of the application, generate a component map that links the identifier of the first component to the first web service call; and
   subsequent to scanning the server code, generate a web service map that links the first web service call to the web service, and
   wherein the instructions that cause the processor to combine the results of the scanning of the code of the application and of the server include instructions that cause the processor to combine the component map and the web service map into the component profile of the first component.

3. The non-transitory machine-readable storage medium of claim 2, wherein the instructions that cause the component profile of the first component to be displayed within the graphical user interface include instructions that cause the component profile to be displayed in close proximity to the first component and the component profile and the first component to be displayed in a coordinated visual style.

4. The non-transitory machine-readable storage medium of claim 1, wherein the instructions cause the processor to identify at least one sub-call from the first web service call and include the at least one sub-call in the component profile.

5. The non-transitory machine-readable storage medium of claim 1, wherein the instructions cause the processor to:
- filter the component profile by a type to yield a type-filtered component profile; and
- cause only the type-filtered component profile to be displayed within the graphical user interface.

6. The non-transitory machine-readable storage medium of claim 1, wherein the non-transitory machine-readable storage medium comprises a plug-in for a web browser.

7. The non-transitory machine-readable storage medium of claim 1, wherein the first web service call identifies a first function executed at a first server, and the component profile further comprises a third party call from the first server that identifies a second function executed at a second server.

8. The non-transitory machine-readable storage medium of claim 1, wherein the component profile further comprises at least one database query.

9. The non-transitory machine-readable storage medium of claim 1, wherein the component profile comprises a combination of a client component map that links the identifier of the first component to the first web service call and a web service map that is called by the first web service call.

10. A method, comprising:
- scanning, by a processor, code of an application to identify a first web service call and a first component to be displayed in a graphical user interface that calls the first web service call;
- scanning, by the processor, code of a server to identify a web service to be called by the first web service call;
- combining, by the processor, results of the scanning of the code of the application and of the server to generate a component profile of the first component, wherein the component profile comprises a code flow from an identifier of the first component to the first web service call and to the web service;
- executing, by the processor, the application to display the first component on the graphical user interface;
- in response to the first component on the graphical user interface being selected, querying a database in a storage to identify the component profile of the first component based on the identifier of the first component; and
- causing the component profile of the first component identified in the database to be displayed within the graphical user interface of the application as a result of the first component on the graphical user interface being selected.

11. The method of claim 10, wherein causing the component profile of the first component identified in the database to be displayed comprises causing the component profile to be visually linking the component profile to the first component.

12. The method of claim 11, wherein causing the component profile to be visually linking the component profile to the first component comprises causing the component profile to be displayed in close proximity to the first component and the component profile and the first component to be displayed in a coordinated visual style.

13. The method of claim 10, comprising:
- filtering the component profile by a type to yield a type-filtered component profile; and
- displaying only the type-filtered component profile within the graphical user interface.

14. The method of claim 10, wherein the database is located on a first server, and the first web service call comprises a third party call from the first server that identifies a second function executed at a second server.

15. A computing device, comprising:
- a storage storing instructions; and
- a processor coupled to the storage, wherein the instructions in the storage are executable to cause the processor to:
  - scan a client-server application to identify a first web service call and a first component to be displayed on a graphical user interface that calls the first web service call;
  - generate a client component map that links an identifier of the first component to the first web service call;
  - scan server code to identify a web service that is called by the first web service call;
  - generate a web service map comprising the first web service call and at least one sub-call from the first web service call;
  - combine the client component map and the web service map into a component profile of the first component, wherein the component profile comprises a code flow from the identifier of the first component to the first web service call and to the web service;
  - execute the client-server application to display the first component on the graphical user interface;
  - in response to the first component on the graphical user interface being selected, identify, in a database, the component profile of the first component; and
  - cause the component profile of the first component identified in the database to be displayed within the graphical user interface as a result of the first component being selected.

16. The computing device of claim 15, wherein the instructions that cause the component profile of the first component to be displayed within the graphical user interface include instructions that cause the component profile to be displayed in close proximity to the first component and in a coordinated visual style with the first component.

17. The computing device of claim 15, wherein the instructions are executable to cause the processor to identify a sub-call from the first web service call, and include the identified sub-call in the component profile.

18. The method of claim 10, further comprising:
- subsequent to scanning the code of the application, generating a component map that links the identifier of the first component to the first web service call; and
- subsequent to scanning the server code, generating a web service map that links the first web service call to the web service, and
- wherein combining the results of the scanning of the code of the application and of the server comprises combining the component map and the web service map into the component profile of the first component.

19. The method of claim 10, wherein causing the component profile of the first component to be displayed within the graphical user interface includes causing the component profile to be displayed in close proximity to the first component and in a coordinated visual style with the first component.

20. The method of claim 10, wherein causing the processor to identify a sub-call from the first web service call, and include the identified sub-call in the component profile.

* * * * *